United States Patent [19]

Halberschmidt et al.

[11] Patent Number: 4,488,846

[45] Date of Patent: Dec. 18, 1984

[54] PROCESS AND DEVICE FOR FEEDING GLASS SHEETS TO A FURNACE

[75] Inventors: Friedrich Halberschmidt, Herzogenrath; Josef Audi, Aachen, both of Fed. Rep. of Germany; Herbert Radermacher, Raeren, Belgium; Heinz Uberwolf, Herzogenrath, Fed. Rep. of Germany

[73] Assignee: Saint Gobain Vitrage, Neuilly-sur-Seine, France

[21] Appl. No.: 326,130

[22] Filed: Nov. 30, 1981

[30] Foreign Application Priority Data

Dec. 1, 1980 [FR] France .............................. 80 25437

[51] Int. Cl.³ ...................... C03B 35/16; C03B 25/08
[52] U.S. Cl. ........................................ 414/152; 65/13;
65/29; 65/163; 198/460; 198/575; 198/577;
271/270; 271/273; 414/159; 414/786
[58] Field of Search ............... 414/152, 153, 157, 159,
414/173, 786; 198/460, 572, 575, 577; 271/69,
202, 203, 265, 270, 273, 274; 65/13, 29, 163

[56] References Cited

U.S. PATENT DOCUMENTS

| | | | |
|---|---|---|---|
| 1,728,538 | 9/1929 | Gentil et al. | 198/782 |
| 1,848,102 | 3/1932 | Blair | 65/163 |
| 1,848,898 | 3/1932 | McFarland | 414/157 X |
| 3,101,156 | 8/1963 | Carson et al. | 221/93 |
| 3,182,785 | 5/1965 | Tourtellotte | 198/460 X |
| 3,792,993 | 2/1974 | Artama et al. | 65/163 |
| 3,827,545 | 8/1974 | Buhayar | 271/203 X |
| 4,190,146 | 2/1980 | Knuchel | 198/460 |
| 4,231,465 | 11/1980 | Bourgeois | 198/460 |

FOREIGN PATENT DOCUMENTS

| | | | |
|---|---|---|---|
| 2346407 | 3/1974 | Fed. Rep. of Germany | 198/460 |
| 2164455 | 8/1973 | France . | |
| 2367709 | 5/1978 | France . | |

Primary Examiner—Robert J. Spar
Assistant Examiner—Janice Krizek
Attorney, Agent, or Firm—Pennie & Edmonds

[57] ABSTRACT

A device and a process for feeding glass sheets at a predetermined rate to a furnace having a main conveyor moving at a constant speed and extending through the furnace where glass sheets are to be positioned on the main conveyor separated by a predetermined spacing. An auxiliary conveyor moves supply sheets to the entry side of the main conveyor until a supply sheet is temporarily positioned closer to a sheet on the main conveyor than the predetermined spacing at which point the auxiliary conveyor is stopped. A sheet transfer device is provided for then transferring a supply sheet to the main conveyor from the stopped auxiliary conveyor at the speed of the main conveyor when the distance between the last sheet on the main conveyor and the supply sheet is equal to the predetermined distance.

7 Claims, 3 Drawing Figures

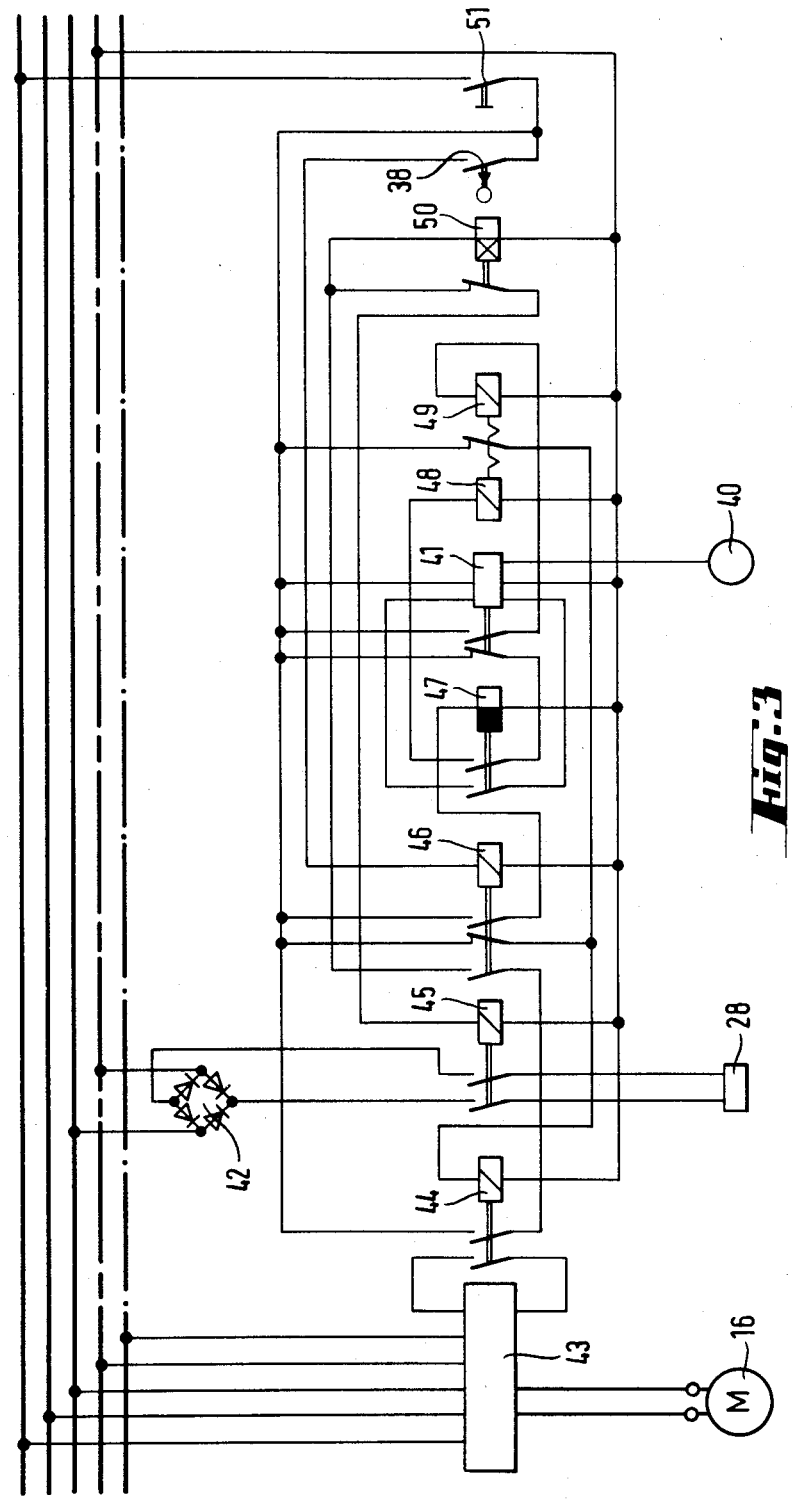

PROCESS AND DEVICE FOR FEEDING GLASS SHEETS TO A FURNACE

TECHNICAL FIELD

This invention relates to a process and a device for feeding glass sheets to a furnace in which the sheets are heated. More particularly the invention relates to a process and device for feeding glass sheets to a conveyor moving at a constant speed through a horizontally extending furnace where the sheets are placed on the conveyor in an unbroken line and with the spacing between adjacent sheets being at a predetermined distance.

BACKGROUND ART

Devices and processes are known in which glass sheets are carried through heating furnaces by conveyor rollers and in some instances gas cushions are used to move glass sheets through at least the hottest part of the furnace. Individual regulation of the temperature of each of the glass sheets has not been achieved in these furnaces. It is essential, however, to bring the glass sheets to as exact a temperature as possible in order to obtain a uniform degree of tempering. Too low a temperature causes insufficient tempering and too high a temperature runs the risk of deformation of the sheet particularly when it is carried flat on rollers. Actually, to obtain a glass sheet of good optical quality and which at the same time has the desired shattering properties, it is necessary to stay within a very narrow temperature bracket which does not exceed a few degrees.

In a tunnel type furnace, sufficient temperature constancy can be attained only if, on the one hand, the furnace is constantly supplied with energy and, on the other hand, the speed of movement of the glass sheets through the furnace is constant so that an energy balance is established. This also means that, to maintain this balance, it is necessary to treat only sheets of the same size and immediately modify settings to establish a new balance if the size is changed. However, the energy balance in the furnace can also be destroyed if the spacing between the glass sheets varies.

It has been found very difficult to arrange sheets manually with constant spacing or by known automatic devices. When it is considered that to feed modern tunnel-type furnaces, six hundred sheets or more per hour must be placed on a conveyor at a uniform rate, it can be seen that only a short period of time is available to place and position each of the sheets which in large measure explains the difficulties.

It is an object of the invention to improve thermal balance of a bending and/or tempering furnace to attain a better temperature constancy of the sheets arriving at bending and tempering stations and thereby achieve a uniform quality of tempered glass sheets from the viewpoint both of optical properties and degree of tempering.

GENERAL DESCRIPTION OF THE INVENTION

Broadly, according to the invention, glass supply sheets are temporarily fixedly placed one by one at an entry end of a main conveyor which moves through a furnace at a constant speed. The supply sheets are placed at the entry end of the main conveyor at the same rate that the supply sheets are placed onto the main conveyor and where the spacing between the last sheet positioned on the moving conveyor and a supply sheet placed at the entry end is less than a predetermined desired spacing between sheets on the main conveyor. When the distance between the trailing edge of the last sheet positioned on the main conveyor and the supply sheet temporarily fixed at the entry end equals the predetermined desired spacing between adjacent sheets on the conveyor, then the supply sheet is moved onto the conveyor.

According to the invention, the supply sheets placed with a reduced spacing are temporarily immobilized while the main conveyor continues to operate at a constant speed. Since the supply sheets are moved onto the main conveyor the moment the desired spacing is reached, the distance traveled from the moment they have left their waiting position is measured and used to cause the following supply sheet to be moved to the entry end of the main conveyor.

According to one form of the invention, supply sheets are each placed in turn on an auxiliary conveyor having a separate drive and placed at the head of the main conveyor. Each supply sheet is placed, at the output of the auxiliary conveyor, a distance from the preceding glass sheet which is already positioned on the main conveyor, the distance being less than the desired final spacing between sheets on the main conveyor. The auxiliary conveyor is stopped every time a supply sheet is presented at its outlet, the distance traveled by the preceding sheet is measured and the transfer of the supply sheet onto the main conveyor and restarting of the auxiliary conveyor is accomplished at the moment when the desired spacing is reached.

Advantageously, the supply sheets are placed on the auxiliary conveyor at the desired spacing and rate during the time the conveyor is stopped.

A device for using the process comprises a horizontal conveyor driven at constant speed and extending through a tunnel-type furnace. An auxiliary conveyor is located upstream from the horizontal conveyor and is provided with a separate drive means. Finally, at the juncture of the two conveyors, a detector associated with a distance measuring means is included and which measures the distance between the trailing edge of the last sheet carried by the main conveyor and the front edge of the following supply sheet placed at the end of the auxiliary conveyor and which operates a transfer means for transferring a supply sheet onto the main conveyor at the very moment the desired spacing is reached.

Advantageously, the auxiliary conveyor is driven at a speed notably higher than that of the main conveyor which makes it possible initially to place the supply sheets with greater spacing.

BRIEF DESCRIPTION OF THE DRAWINGS

FIG. 3 is a diagrammatic view of a control diagram of the device.

DESCRIPTION OF THE BEST MODES

Figure 1:
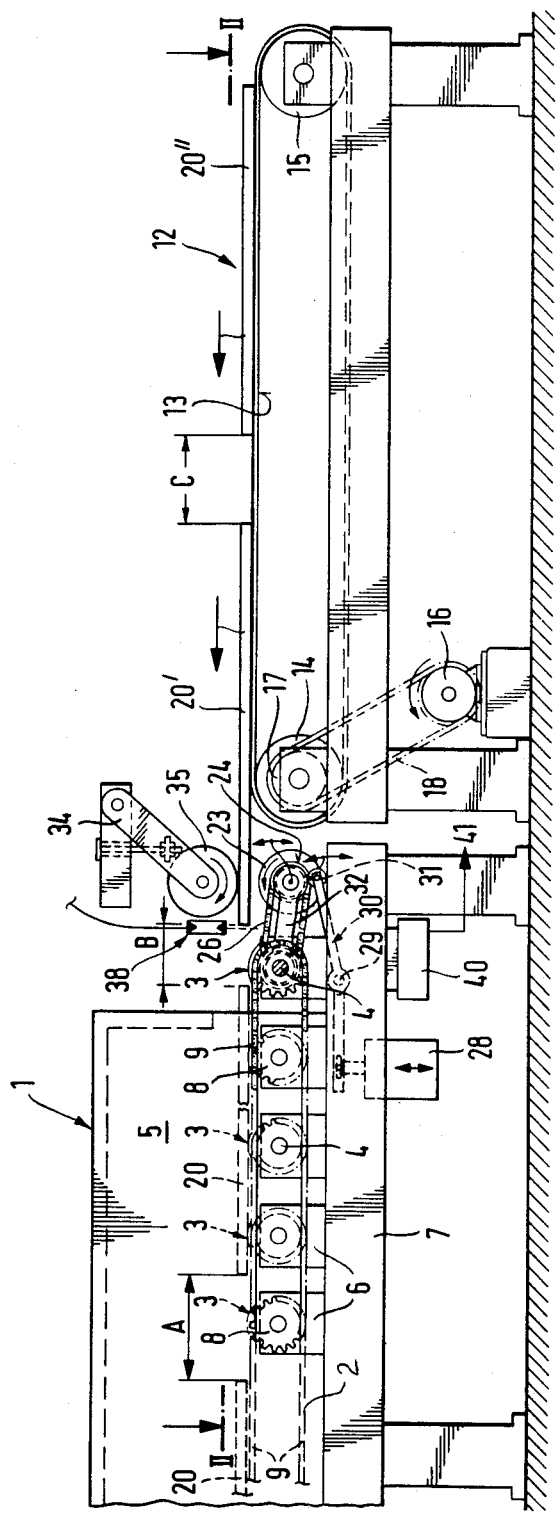
FIG. 1 is a side view of a device constructed according to the invention including a portion of a main conveyor in a tunnel-type furnace preceded by an auxiliary conveyor bringing supply sheets into a determined position.
Figure 2:
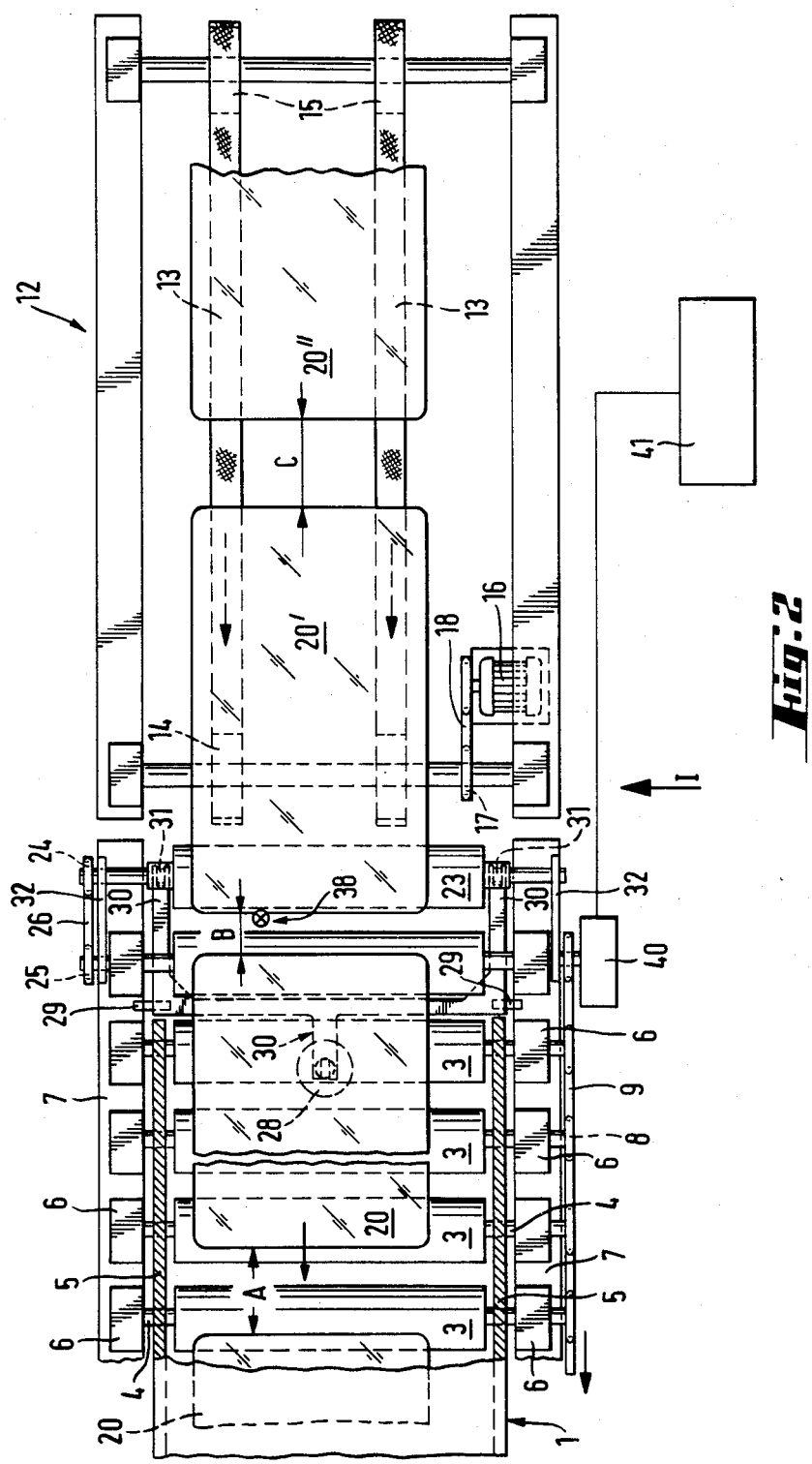
FIG. 2 is a horizontal section along line II—II of FIG. 1.

Referring to FIGS. 1 and 2, there is illustrated a horizontally extending tunnel-type furnace 1 having a horizontal main conveyor 2 comprising rollers 3 passing therethrough and which move at a constant speed. The shafts 4 of rollers 3 are mounted to turn on the outside of side walls 5, in bearings 6 placed on frame 7 of the furnace. Toothed wheels 8 are mounted on shafts 4 on a side of the furnace and on the outside of the bearings, and a chain 9, driven by a motor not shown, imparts a constant rotational speed to all the conveyor rollers.

At the opposite end of furnace 1, not shown, glass sheets 20 emerge from the furnace at the desired temperature and are usually carried to a bending station, also not shown, where they undergo a cylindrical and possibly spherical bending, then to a tempering station, not shown, where they are suddenly cooled between two blow boxes, not shown.

If necessary, the glass sheets can be tempered directly without having to undergo bending at the furnace outlet or, more rarely, undergo only bending.

In order that the glass sheets 20 will have a temperature that is always identical at the outlet of furnace 1, the rotational speed of the conveyor rollers and the calorific energy input to the furnace should be kept constant. An auxiliary endless conveyor 12 having belts 13, mounted on rollers 14 and 15, is placed upstream from the tunnel furnace 1 and the entry end of the main conveyor. Rollers 14 are driven by a motor 16 to which toothed wheel 17, placed at the end of the shaft, is connected by a chain 18. The carrying speed of this auxiliary conveyor is advantageously 20 to 50% and preferably 20 to 30% greater than that of the main conveyor comprising the rollers 3.

The glass supply sheets which are to be treated are stored in the vicinity of auxiliary conveyor 12, and are manually or automatically placed on it by way of an automatic loader. The auxiliary conveyor is brought to the same level as main conveyor 2 to which it successively carries sheet 20, then sheet 20', then sheet 20" . . . and so on.

A sheet transfer means comprising a transfer roller 23 is mounted between the auxiliary conveyor 12 and the first of the rollers 3 of the main conveyor 2 under the conveyor plane. The transfer roller 23 is connected to main conveyor 2 by a transmission comprising toothed wheels 24 and 25 and a chain 26 which gives it a peripheral speed equal to that of conveyor rollers 3. This transfer roller 23 can move between a low position and a high position. In the low position it is out of contact with a sheet 20' lying over it and its movement of rotation is therefore not transmitted to the sheet. An electromagnet 28 is connected to a fork lever 30 which is pivotal on bearings 29 and one end of which carries a pressure roller 31. Roller 31 in turn engages the shaft of the transfer roller which is mounted on the end of two pivotal arms 32. Downward movement of the electromagnet will cause the fork lever 30 to rotate counter-clockwise about bearing 29 to raise the pressure roller and consequently the transfer roller 23 until it contacts the bottom surface of the sheet 20'.

An opposing roller 35 is positioned above transfer roller 23 and is adapted to contact the upper surface of the sheet 20' to provide an opposing force to insure firm driving engagement between the transfer roller and sheet 20' so that the sheet may be moved at the speed of the main conveyor onto the main conveyor comprising the rollers 3.

The device of the invention includes a detector 38 positioned behind opposing roller 35. This detector is responsive to light reflected from the leading edge of a glass supply sheet 20' when the edge of the sheet is plumb with the detector and serves to supply a signal which, as explained below, operates the device.

The shaft of the first conveyor roller is connected to a pulse generator 40 which operates a selector counting register 41 making it possible to regulate the spacing between the trailing edge of sheet 20 and the leading edge of supply sheet 20' to a desired value and especially to the desired spacing between sheets positioned on the main conveyor.

Reference is made to FIG. 3 to further understand operation of the device. When switch 51 is triggered by a machine operator, relay 44 is energized and electric motor 16 of the auxiliary conveyor 12 is started by servo relay 43.

When the front edge of an initial sheet 20 activates detector 38, relay 46 is energized by relay 44 and continues to be fed by contacts 48/49 so that conveyor 12 continues to advance, while electromagnet 28, connected to the power network by rectifier 42, has voltage applied to it by the contact of power relay 45 and presses transfer roller 23 on sheet 20. Sheet 20 which rests under opposing roller 35 is instantaneously moved at the speed of the main conveyor and passes over the conveyor rollers 3 into the furnace.

Simultaneously, time relay 50 is set and after a period determined by this relay or, at the outside limit, when the trailing edge of the initial sheet 20 passes under detector 38, relay 46 is deenergized. Relay 45 then falls back so that electromagnet 28 is no longer fed and transfer roller 23 is lowered.

When sheet 20 leaves detector 38, relay 46 releases servo contactor 47. Contactor 47, at its descent supplies a signal to register 41 to trigger counting of the pulses of generator 40 to measure the advance of the trailing edge of sheet 20 onto the main conveyor behind the detector 38.

At the same time, servo contactor 47, by way of coil 48, opens contacts 48/49. However, relay 44 continues to be fed by relay contact 46 so that conveyor 12 continues advancing.

As soon as the number of pulses recorded on the selector of register 41 is reached, i.e., at the moment the trailing edge of sheet 20 is at the desired distance from the detector 38, register 41 emits a signal that energizes coil 49 thus closing contacts 48/49. If a supply sheet 20' has been placed on conveyor 12 close enough to the preceding sheet for its leading edge to reach detector 38 before the end of the counting, i.e., when sheet 20 is only at distance B, less than distance A, as shown in FIG. 1, thus energizing relay 46 when contacts 48/49 are still open, feeding of relay 44 is cut off which stops conveyor 12 and immediately immobilizes or temporarily fixes sheet 20'.

A new supply sheet 20" may be placed on the auxiliary conveyor at a suitable distance C from sheet 20' during the stoppage of the conveyor.

As soon as the number of pulses recorded on register 41 is reached, the contacts 48/49 close, and as explained above, relay 44 is again energized and conveyor 12 restarts but, simultaneously, since detector 38 has been interrupted so that control relay 46 has been fed, electromagnet 28 lifts transfer roller 23, transferring supply sheet 20' onto the main conveyor at the speed of the latter, while sheet 20" in turn approaches the detector.

Therefore, it suffices to load conveyor 12 at a rate corresponding to that of the main conveyor, but systematically ahead of the latter so that successive sheets are spaced at the predetermined desired distance A on the main conveyor.

So that it will be possible initially to place the sheets on the auxiliary conveyor at a spacing C greater than spacing B at the site of the detector and even, if necessary, greater than the desired spacing A on the main conveyor, it suffices that the speed of the auxiliary conveyor 12 preferably be faster than that of the main conveyor. The only limitation to the faster speed of the auxiliary conveyor is that the movement of a supply sheet by the auxiliary conveyor not catch up with the movement of a supply sheet onto the main conveyor by the sheet transfer means.

We claim:

1. A device for feeding glass sheets to a furnace including a horizontally extending main conveyor continuously movable at a constant speed through said furnace and which is adapted to support a plurality of glass sheets spaced apart along the conveyor at a predetermined distance, characterized in having an auxiliary conveyor with a separate drive from said main conveyor adapted to feed glass sheets to an entry end of the main conveyor, a detector for detecting the leading edge of a glass sheet supplied to said entry side to stop said auxiliary conveyor, a distance measuring means for measuring the distance between the trailing edge of a sheet on the main conveyor and leading edge of a sheet on the auxiliary conveyor, sheet transfer means responsive to said distance measuring means when said auxiliary conveyor is stopped for transferring a sheet from the auxiliary conveyor to the main conveyor when the distance measured by said distance measuring means equals said predetermined distance, and means drivingly connecting said sheet transfer means and said main conveyor drive whereby each sheet is transferred to said main conveyor at a speed of movement substantially equal to said constant speed.

2. A device according to claim 1 further characterized in that said auxiliary conveyor moves at a greater speed than said main conveyor.

3. A device according to claim 2 further characterized in that said auxiliary conveyor moves at a 20%–50% greater speed than said main conveyor.

4. A device according to claim 1 further characterized in that the distance measuring means comprises a pulse generator coupled to the main conveyor and a selector counting register.

5. A device according to claim 1 further characterized in that said sheet transfer means comprises a transfer roller positioned between the auxiliary conveyor and the entry side of the main conveyor, said drive means for said transfer roller driving said transfer roller thereby to rotate said roller whereby its peripheral speed is equal to the speed of the main conveyor, transfer roller actuation means for raising and lowering said roller into and out of engagement with a glass sheet, and an opposing roller positioned opposite said transfer roller adapted to engage an opposite side of a glass sheet than said transfer roller.

6. A process for feeding glass sheets to a furnace to maintain the energy balance therein including positioning the sheets at a predetermined rate horizontally on a main conveyor continuously moving at a constant speed through a horizontally extending furnace with the spacing between adjacent sheets on the main conveyor being at a predetermined distance and with the glass sheets being obtained from a plurality of supply sheets, comprising the step of temporarily fixedly positioning the supply sheets at the predetermined rate by means of an auxiliary conveyor one by one at an entry end of the main conveyor with the spacing between a supply sheet and the next adjacent sheet on the main conveyor being less than said predetermined distance, the step of stopping the auxiliary conveyor when a supply sheet is brought to the entry end of the main conveyor and is spaced from the next adjacent sheet on the main conveyor by a distance less than said predetermined distance, and the step of moving the supply sheet onto the main conveyor at the speed of movement of said main conveyor when the spacing between the supply sheet and the next adjacent sheet is equal to said predetermined distance.

7. A process according to claim 6 including the additional step of placing at said predetermined rate a supply sheet on the auxiliary conveyor when it is stopped spaced from the supply sheet at the entry end of the main conveyor.

* * * * *